United States Patent [19]

Ida et al.

[11] Patent Number: 5,098,028
[45] Date of Patent: Mar. 24, 1992

[54] CLOCK SPRING CONNECTOR INCLUDING CABLE STOWAGE GROOVES

[75] Inventors: Yuichi Ida; Yoshihiro Ohashi; Mitsunori Matsumoto; Hiroyuki Bannai; Hironori Kato, all of Miyagi, Japan

[73] Assignee: Alps Electric Co., Ltd., Tokyo, Japan

[21] Appl. No.: 531,189

[22] Filed: May 31, 1990

[30] Foreign Application Priority Data

Jun. 5, 1989 [JP] Japan .................. 1-64872[U]
Nov. 24, 1989 [JP] Japan .................. 1-135339[U]
Nov. 30, 1989 [JP] Japan .................. 1-138043[U]

[51] Int. Cl.⁵ .......................................... B65H 75/02
[52] U.S. Cl. ................................ 242/54 R; 439/15; 191/12.2 R
[58] Field of Search ............ 242/54 R, 107.1, 100.1; 191/12 R, 12.2 R, 12.2 A, 12.4; 439/4, 13, 15

[56] References Cited

U.S. PATENT DOCUMENTS

| | | |
|---|---|---|
| 2,729,473 | 1/1956 | Warshawsky .................. 439/13 X |
| 3,120,355 | 2/1964 | Bowman ........................ 191/12.2 |
| 4,421,960 | 12/1983 | Arima et al. .................. 439/15 X |
| 4,542,858 | 9/1985 | Manges ........................ 242/54 R |
| 4,565,333 | 1/1986 | Meneian ....................... 242/54 R |
| 4,721,469 | 1/1988 | Carlson ........................ 439/13 |
| 4,844,359 | 7/1989 | Kato ............................ 242/54 R |
| 4,874,138 | 10/1989 | Kettenring ................... 242/54 R |
| 4,938,700 | 7/1990 | Campbell et al. ............. 439/13 |

*Primary Examiner*—John M. Jillions
*Attorney, Agent, or Firm*—Guy W. Shoup; B. Noel Kivlin

[57] ABSTRACT

In a clock spring connector using cables for electrical connection between a stationary member and a movable member which is rotatably mounted in relation to the stationary member, spiral or concentrical cable stowage grooves on both the stationary and the movable side are provided in a space for cable stowage, the cables being wound along either one of these cable stowage grooves and the remaining portion of the cables being wound reversely along the other cable stowage grooves, thereby decreasing the required length of the cables to half the amount of a rotation of the movable member.

23 Claims, 12 Drawing Sheets

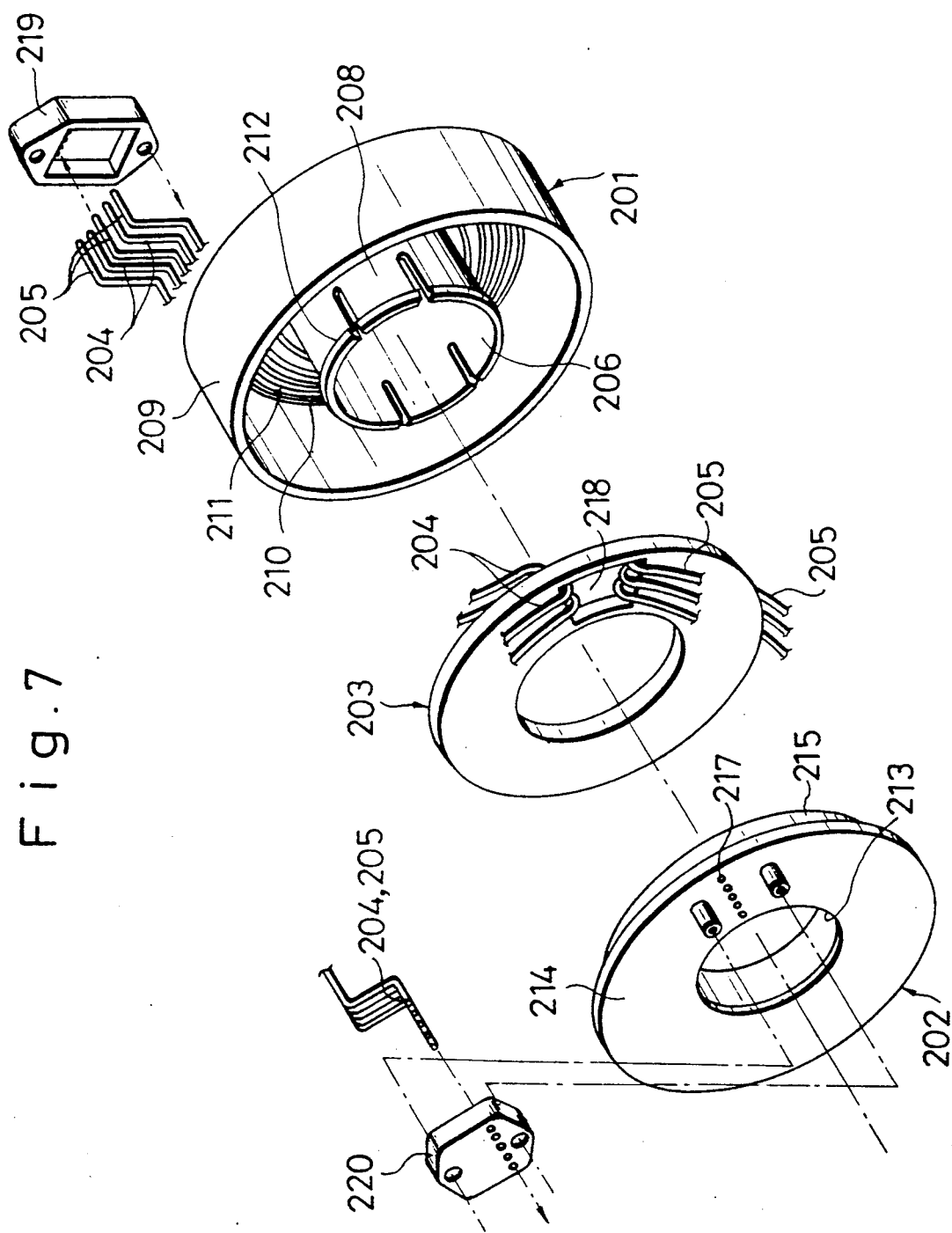

CLOCK SPRING CONNECTOR INCLUDING CABLE STOWAGE GROOVES

BACKGROUND OF THE INVENTION

1. Field of the Invention

The present invention relates to a clock spring connector used in an automotive steering system and utilizing cables for establishing an electrical connection between a stationary member and a movable member.

2. Description of the Prior Art

In a clock spring connector are generally used flexible cables for electrical connection between a stationary member and a movable member rotatably attached to the stationary member, which is used for example as an electrical connection device in an automotive steering system.

A type of clock spring connector has been known in which a flat cable comprising a plurality of conductors laminated into a pair of band like films is loosely stored in a spirally wound state in a cable stowage section provided between a stationary member and a movable member, one end of the flat cable being fixedly attached to an outer peripheral wall formed on either one of the stationary member and the movable member, and the other end being fixedly attached to an inner peripheral) wall formed on the other member.

This clock spring connector is capable of coiling the flat cable stowed in the cable stowage section, to the inner peripheral wall side and displacing a section of the flatcable into the outer peripheral wall side in accordance with the direction of rotation of the movable member when the movable member is rotated. Therefore, within a range from the fully coiled state of the flat cable on the inner peripheral wall side to the fully displaced state of the flat cable on the outer peripheral wall side, it is possible to constantly maintain an electrical connection between the stationary member and the movable member which make relative rotation, giving almost no tension to the flat cable.

Since the clock spring connector of the aforementioned constitution coils and uncoils the flat cable by utilizing a difference in diameter between the outer peripheral wall and the inner peripheral wall, the length of the flat cable can be decreased by increasing this difference in diameter when the amount of rotation of the movable member is held unchanged. However, the inner peripheral wall diameter is determined simply and solely from the diameter of a rotating shaft on which the clock spring connector is to be mounted, for example the diameter of a steering shaft of an automobile. In the meantime, since the outer peripheral wall can not be provided with so large a diameter because of a demand for the use of a compact steering system, it is impossible to increase the difference in diameter between these outer and inner peripheral walls. Therefore, this type of clock spring connector generally requires a long and large flat cable, which, however, is difficult to manufacture, resulting in a high total cost of the clock spring connector.

SUMMARY OF THE INVENTION

It is, therefore, an object of the present invention to provide an inexpensive, small-type clock spring connector with particularly short cables.

In the clock spring connector having a stationary member, a movable member rotatably mounted on the stationary member, and cables stowed in the cable stowage section formed between the stationary member and the movable member, with one end of the cables fixedly attached to the stationary member and led outwardly and with the other end fixedly attached to the movable member and led outwardly, the aforesaid object of the present invention is accomplished by providing, in the cable stowage section, a stationary-side cable stowage groove and a movable-side cable stowage groove which are concentrically arranged on the center of the rotating shaft of the movable member, coiling a plurality of cables, all in one direction, along either one of the stationary- and movable side cable stowage qrooves, and coiling the remaining portion of the cables in a reverse direction along the other cable stowage groove.

According to the clock spring connector of such a constitution as described above, the cables are paid out by half the amount of rotation of the movable member from one of the cable stowage grooves into the other when the movable member is rotated in relation to the stationary member. Therefore, as it is sufficient that the cables are coiled by half a turn of the movable member into the cable stowage groove, length of the cables used can be decreased, thereby realizing the reduction of manufacturing cost and the miniaturization of the cable stowage section.

Furthermore, in the clock spring connector having the stationary member, the movable member rotatably mounted on the stationary member, and the cables stowed in the cable stowage section formed between the stationary member and the movable member, with one end of the cables fixedly attached to the stationary member and led outwardly and with the other end fixedly attached to the movable member and led outwardly, the aforesaid object of the present invention is accomplished by providing the stationary-side cable stowage groove and the movable-side cable stowage groove which are concentrically arranged on the center of the rotating shaft of the movable member in the cable stowage section, coiling a plurality of cables in twq directions, normal and reverse, along either one of the stationary- and movable-side cable stowage grooves, and coiling the remaining portion of the cables in a reverse direction along the other cable stowage groove.

According to the clock spring connector of such a constitution, when the movable member is turned in either of the normal and reverse directions in relation to the stationary member, the cables wound in the same direction as the direction of rotation of the movable member within the movable-side cable stowage groove are paid out by half the amount of rotation of the movable member into the stationary-side cable stowage groove, while the cables wound in the reverse direction of rotation of the movable member are uncoiled by half the amount of rotation of the movable member into the movable-side cable stowage groove from the stationary-side cable stowage groove.

Furthermore, in the clock spring connector having the stationary member, the movable member rotatably mounted on the stationary member, and the cables stowed in the cable stowage section formed between the stationary member and the movable member, with one end of the cables fixedly attached to the stationary member and led outwardly and with the other end fixedly attached to the movable member and led outwardly, the aforesaid object of the present invention is accomplished by providing spiral stationary-side cable stowage groove and movable side cable stowage groove which extend oppositely to each other within the cable stowage section, winding the cables along either one of the stationary- and movable side cable stowage grooves, and winding the remaining portion of the cables reversely along the other cable stowage groove.

According to the clock spring connector of such a constitution described above, when the movable member is turned in relation to the stationary member, the cables are paid out by half the amount of rotation of the movable member from one spiral cable stowage groove into the other signal cable stowage groove.

Furthermore, in the clock spring connector having the stationary member, the movable member rotatably mounted on the stationary member, and the cables stowed in the cable stowage section formed between the stationary member and the movable member, with one end of the cables fixedly attached to the stationary member and led outwardly and with the other end fixedly attached to the movable member and led outwardly, the aforesaid object of the present invention is accomplished by rotatably disposing a rotating member in the cable stowage section, providing the stationary-side cable stowage groove and the movable-side cable stowage groove which are concentrically arranged on the center of the rotating shaft of the movable member in each of the cable stowage sections separated into two sections by this rotating member, winding the cables along one of the stationary- and movable-side cable stowage grooves, and winding the remaining portion of the cables in a reverse direction along the other cable stowage groove.

According to the clock spring connector of such a constitution, when the movable member is turned relative to the stationary member, the rotating member turns by half the amount of its rotation in the same direction as the movable member, the cables of length equal to the amount of rotation of the rotating member are paid out from either one of the cable stowage grooves to the other.

BRIEF DESCRIPTION OF THE DRAWINGS

Other features and advantages of the present invention will be apparent from the following description taken in conjunction with the accompanying drawings, in which, FIGS. 1 to 6 explain a clock spring connector according to a first embodiment of the present invention, wherein

FIGS. 7 to 13 explain a clock spring connector according to a second embodiment of the present invention, wherein FIG. 7 is an exploded perspective view of the whole body of the clock spring connector;

FIG. 8 is a plan view, partly broken, of the clock spring connector;

FIG. 9 is a sectional view of the clock spring connector;

FIG. 10 is a bottom view of the upper case;

FIGS. 11 and 12 explanatory views showing the operation of the flexible cable;

FIG. 13 is a plan view showing a modification of a spacer;

FIGS. 14 to 20 explain a clock spring connector according to a third embodiment of the present invention, wherein FIG. 14 is an exploded perspective view of the whole body of the clock spring connector;

FIG. 15 is a plan view of the clock spring connector;

FIG. 16 is a sectional view of the clock spring connector;

FIG. 17 is a bottom view of the upper case;

FIG. 18 is a perspective view showing a gear in a stowed state;

FIG. 19 is an explanatory view showing the operation of the flexible cable; and

FIG. 20 is a perspective view showing a modification of the spacer.

DESCRIPTION OF THE PREFERRED EMBODIMENTS

Preferred embodiments of the present invention will hereinafter be explained with reference to the drawings.

Figure 1:
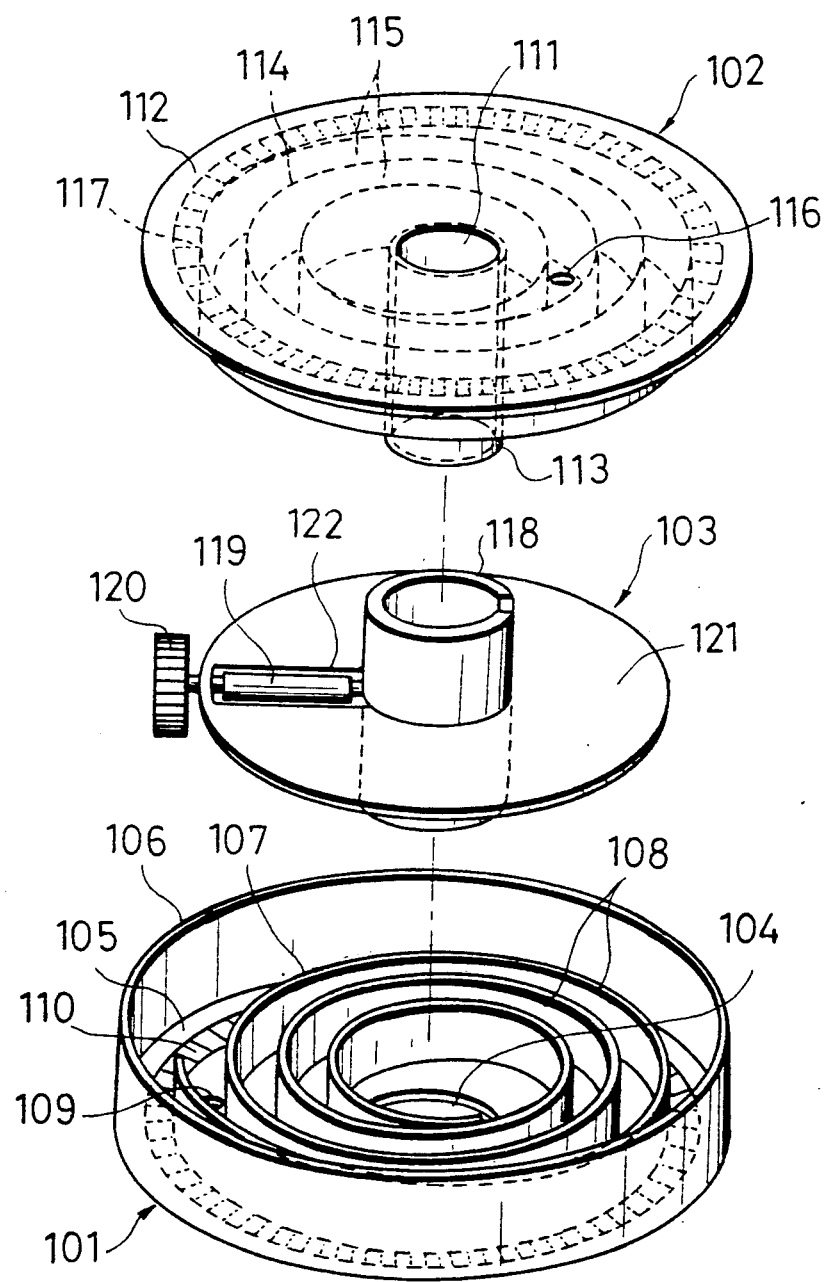
FIG. 1 is an exploded perspective view of the whole body of the clock spring connector.

The clock spring connector according to a first embodiment of the present invention, as shown in FIG. 1, comprises a lower case 101, an upper case 102, and an intermediate member 103 disposed between these cases 101 and 102.

The lower case 101, as shown in this drawing, is a shallow, bottomed cylindrical case having a bottom plate 105 provided with a center hole 104 at center and an outer peripheral wall 106 vertically provided on the outer peripheral edge of this bottom plate 105. Between the center hole 104 and the outer peripheral wall 106 is a spiral wall 107 which is vertically set on the bottom plate 105 and lower than the outer peripheral wall 106. And between the adjacent spiral walls 107 is a spiral cable stowage groove 108. This cable stowage groove 108 has sufficient width and depth to loosely stow a flexible cable, for example a covered electric wire of circular cross section. In the outer peripheral end section is provided a cable hole 109 open to the lower surface of the bottom plate 105. Between the outer peripheral wall 106 and the spiral wall 107 is formed a ring-like gear 110 by which the intermediate member 103 described later on can be driven.

The upper case 102, as shown in FIG. 1, is in the form of cover capable of covering the opening of the lower case 101 with a top plate 112 having a center hole 111 at the center and a cylindrical center shaft 113 downwardly projecting at the center of this top plate 112. This upper case 102 has a spiral wall 114 in a position corresponding to the spiral wall 107 formed on the lower case 101, at the same pitch between the spiral wall 107 and the groove with an opposite winding direction, thereby forming a spiral cable stowage groove 115 between adjacent spiral walls 114. This cable stowage groove 115 also has the same width and depth as the cable stowage groove 108 formed in the lower case 101. In the inner peripheral end section is provided a cable hole 116 open to the upper surface of the top plate 112. On the top plate 102, in the position corresponding to the gear 110, a gear 117 similar to the gear 110 is formed.

Figure 2:
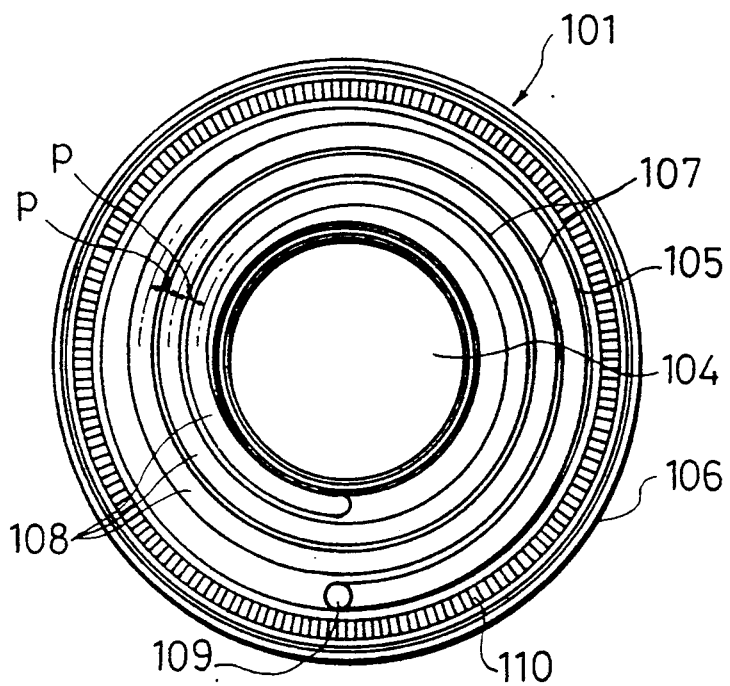
FIG. 2 is a plan view showing a lower case.
Figure 3:
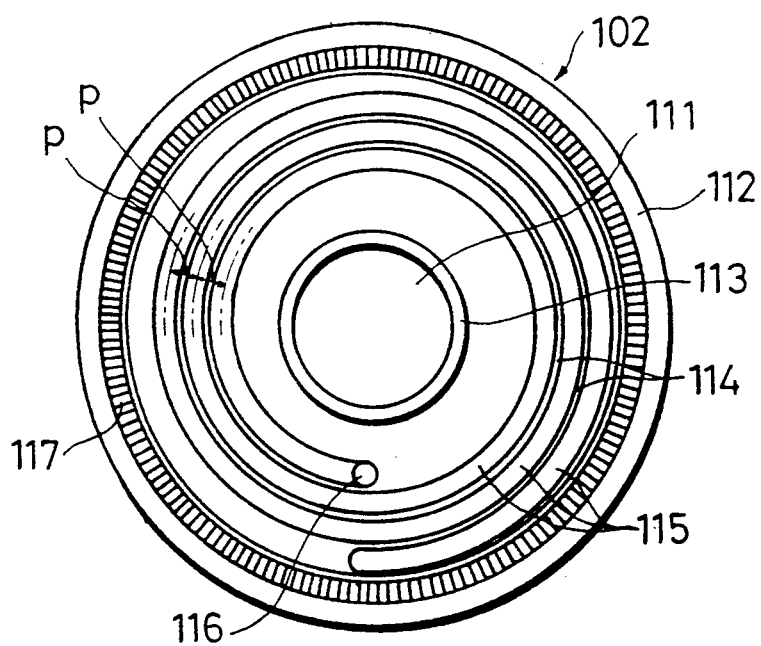
FIG. 3 is a bottom view of an upper case.
Figure 4:
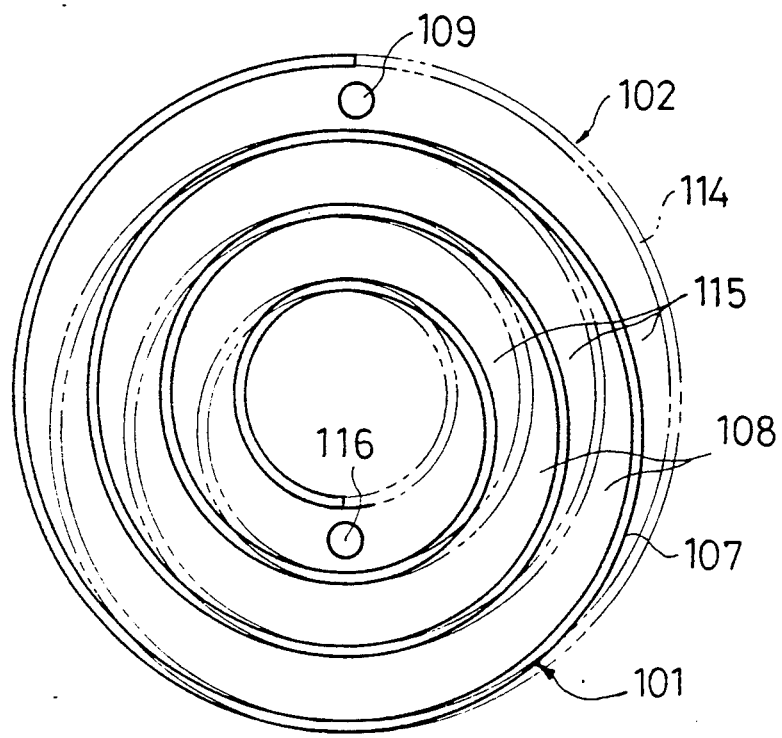
FIG. 4 is an explanatory view showing a relationship between a cable stowage groove formed in the lower case and a cable stowage groove formed in the upper case when the upper and lower cases are joined.

The cable stowage groove 108 formed in the lower case 101 and the cable stowage groove 115 formed in the upper case 102 are arranged at the same groove pitch P and in the same direction of turn as viewed from above the lower case 101 and from below the upper case 102 (FIG. 1) as shown in FIGS. 2 and 3. When the lower case 101 and the upper case 102 are combined into a functional state, the two cable stowage grooves 108 and 115 have opposite winding directions as shown in FIG. 4; and therefore when these cases 101 and 102 are turned in relative directions, the cable stowage grooves 105 and 115 always partially cross each other.

The intermediate member 103, as shown in FIG. 1, consists of a cylindrical support shaft 118 into which the center shaft 113 projection provided on the upper case can be inserted, a roller 119 extending in the radial direction of this support shaft 118, a gear 120 fixedly installed at the forward end of this roller 119, and a slide sheet 121 outwardly extending from the peripheral surface of the support shaft 118.

The slide sheet 121 serves to allow smooth movement of the flexible cable stowed in the cable stowage grooves 108 and 115. In the position corresponding to the roller 119, there is provided a through hole 122 for inserting this roller 119 and a flexible cable 123. For the slide sheet 121, a polytetrafluoroethylene (Trademark: Teflon) sheet for example can be used.

Figure 5A:
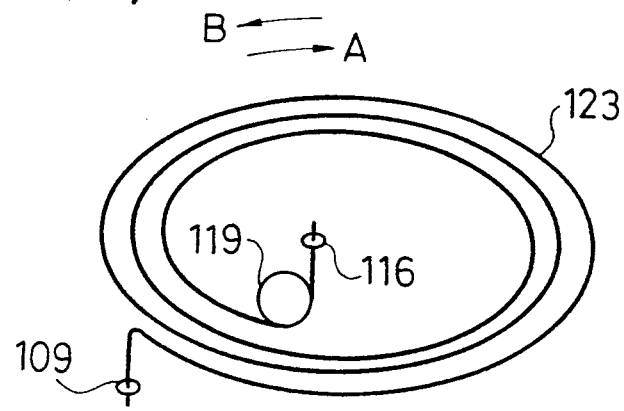
FIG. 5 (a), (b) and (c) are explanatory views showing a flexible cable stowed.
Figure 5B:
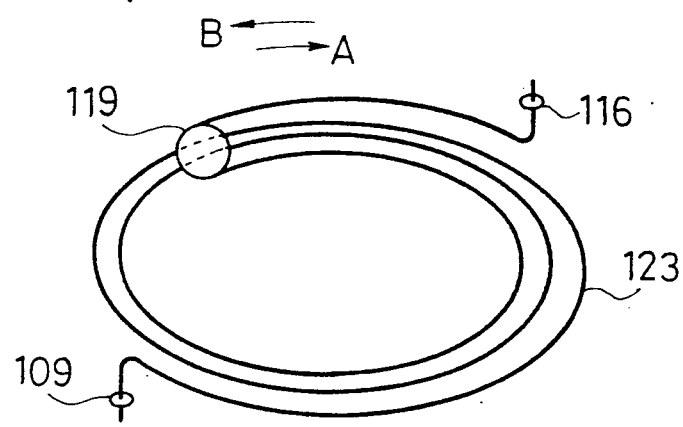
Figure 5C:
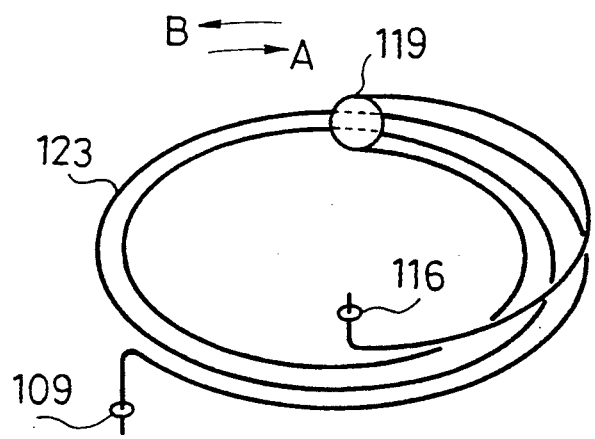

The flexible cable 123, as shown in FIG. 5 (a), (b) and (c), is coiled in a spiral form along the cable stowage groove 108 formed in the lower case 101, with its one end wound about a half turn on the roller 119 and directed backwardly, and with the other end wound along the cable stowage groove 115 formed in the upper case 102.

Figure 6:
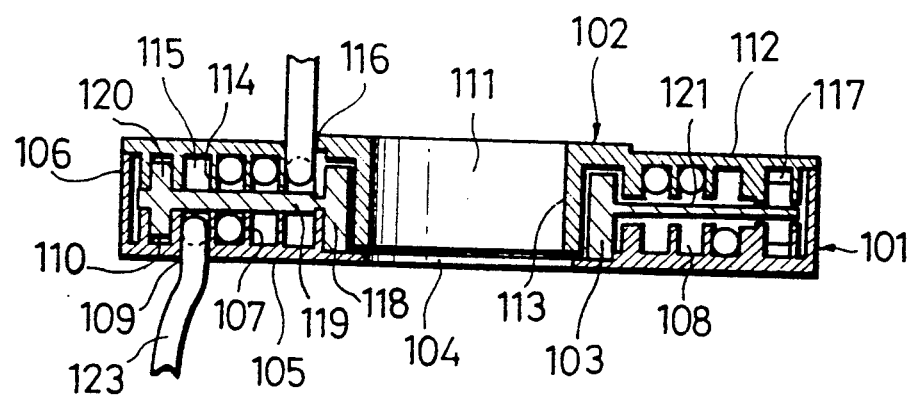
FIG. 6 is a sectional view of the clock spring connector.

One end of this flexible cable 123 is fixedly attached to the lower case 101, being led outwardly at the cable hole 109 provided in the lower case 101. The other end of this flexible cable 123 is fixedly attached to the upper case 102, being led outwardly at the cable hole 116 provided in the upper case 102 as shown in FIG. 6.

Next, the operation of the clock spring connector according to the aforesaid embodiment will be explained with reference to FIG. 5 (a), (b) and (c), using an example that the lower case 101 is used as a stationary member and the upper case 102 as a movable member. In these drawings, the roller 119 is shown as a simple circle and the flexible cable 123 as one thick line for the purpose of simplification of the drawing. The lower case 101 and the upper case 102 are not illustrated.

First, as shown in FIG. 5 (a), when, with the lower case 101 fixed, the upper case 102 is turned in the direction of the arrow A from the state that almost all the part of the flexible cable 123 is coiled in the cable stowage groove 108 of the lower case 101, the cable hole 116 of the upper case moves by the amount of its rotation in the direction of the arrow A as shown in FIG. 5 (b) and the roller 119 also moves in the direction of the arrow A by half the amount of rotation of the cable hole 116. The flexible cable 123 having a length equal to the travel of the roller 119 goes out of the lower case 101, being wound into the case stowage groove 115 of the upper case 102.

Therefore, when the upper case 102 is given one turn in the direction of the arrow A, the roller 119 makes a half turn as shown in FIG. 5 (c), and the flexible cable 123 is coiled by half the turn into the cable stowage groove 115 of the upper case 102.

Thereafter, the upper case 102 can be turned in the direction of the arrow A until all the flexible cable 123 stowed in the cable stowage groove 108 of the lower case 101 is wound into the cable stowage groove 115 of the upper case 102, that is, through twice as many (6 turns) as the number of turns (3 turns in this embodiment) of the flexible cable 123 coiled in the lower case 101.

Conversely when the upper case 102 is rotated in the direction of the arrow B from the state that almost all the part of the flexible cable 123 has been stowed in the stowage groove 115 of the upper case 101, the cable hole 116 of the upper case 102 moves by the amount of its turn in the direction of the arrow B and also the roller 119 moves by half the amount of rotation of the cable hole 116 in the direction of the arrow B, thus winding the flexible cable 123 having the length equal to the travel of the roller 119, back into the cable stowage groove 108 of the lower case 101.

The clock spring connector of this embodiment, as described above, is sufficient if provided with the flexible cable 123 having a length as long as half the required amount of rotation of the lower case 101 and the upper case 102. It is, therefore, possible to make the flexible cable extremely short as compared with conventional similar clock spring connectors. Also because a short flexible cable is usable, it is possible to decrease the diameter of the cable stowage section.

The lower case 101 and the upper case 102 have, in their opposite surfaces, spiral cable stowage grooves 108 and 115 formed at the same groove pitch P and in opposite direction of winding, so that both the cable stowage grooves 108 and 115 communicate at all times with each other at the turning section (the turning position of the roller 119) of the flexible cable 123 even when the upper case 102 rotates to any position in relation to the lower case 101. Because of this structure, the flexible cable 123 can be smoothly coiled from the cable stowage groove 108 formed in the lower case 101 into the cable stowage groove 115 formed in the upper case 102, and also uncoiled from the cable stowage groove 115 formed in the upper case 102 back into the cable stowage groove 108 formed in the lower case 101.

Furthermore, the slide sheet 121 interposed between the lower case 101 and the upper case 102 ensures smooth coiling and uncoiling of the flexible cable 123 without entanglement of the flexible cable stowed in the cable stowage groove 108 of the lower case 101 and the flexible cable stowed in the cable stowage groove 115 of the upper case 102.

In the embodiment described above, there have been explained the lower case 101 used as a stationary member and the upper case 102 used as a movable member. Conversely, it is possible to use the upper case 102 as the stationary member and the lower case 101 as the movable member.

Furthermore, in the embodiment described above, the spiral cable stowage grooves 108 and 115 are formed in the opposite surfaces of the lower case 101 and the upper case 102, but it is possible to form the cable stowage grooves concentrically to wind the flexible cable in each cable stowage groove. In the embodiment, the spiral cable stowage grooves 108 and 115 are formed by winding one groove in each of the cases 101 and 102, but a plurality of parallel spiral cable stowage grooves may be formed in a form of multiple spiral grooves.

Furthermore, in the embodiment described above, the gears 110, 117 and 120 are employed as means for driving the intermediate member 103, but they may be substituted for by another type of power transmission mechanism, for example a frictional surface and a friction wheel which rotates thereon.

Figure 8:
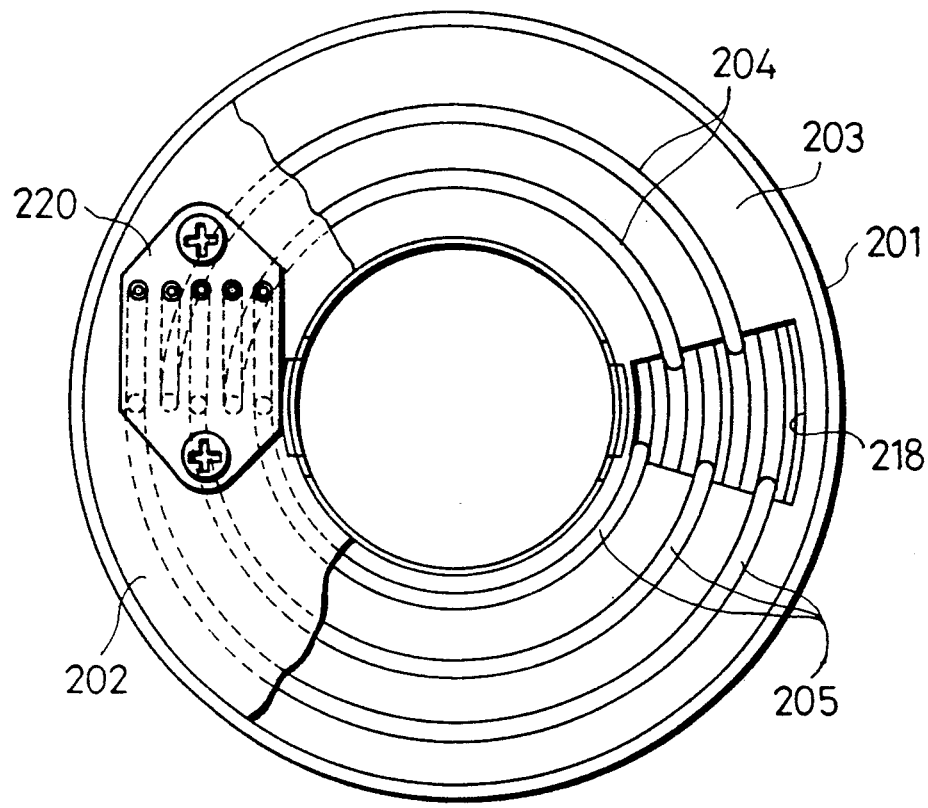
Figure 9:
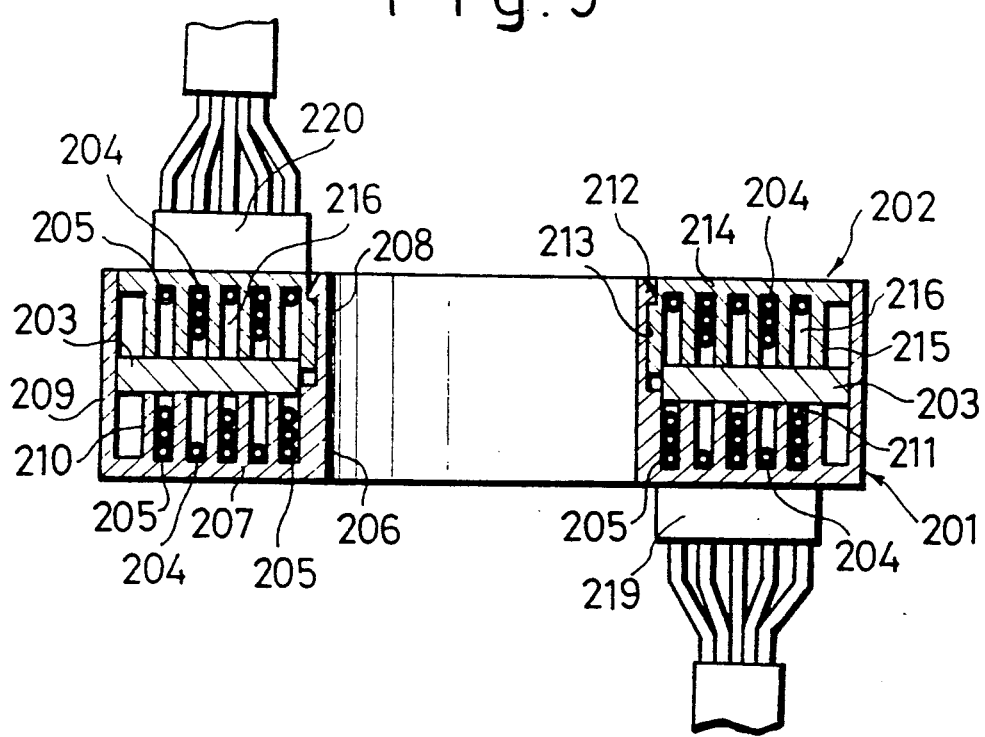

Next a second embodiment of the present invention will be explained. The clock spring connector according to this embodiment, as shown in FIGS. 7 to 9, roughly comprises a lower case 201, an upper case 202 rotatably supported in relation to this lower case 201, a spacer 203 rotatably held between these two cases 201 and 202, and flexible cables 204 and 205 wound between the two cases 201 and 202.

The lower case 201 has a bottom plate 207 provided with a center hole 206 at center and inner and outer peripheral walls 208 and 209 provided on the inner and outer peripheries of this bottom plate 207, and is formed into a bottomed cylinder on the whole. The bottom plate 207 has a plurality of projecting walls 210, which are concentrically formed with the center hole 206 at center, and a plurality (five in this embodiment) of first cable stowage grooves 211 are concentrically formed by adjacent projecting walls 210. Each of the first cable stowage grooves 211 has a cable hole (not illustrated) for leading out the cable. The inner peripheral wall 208 is provided with a collar section 212 at the top end thereof.

Figure 10:
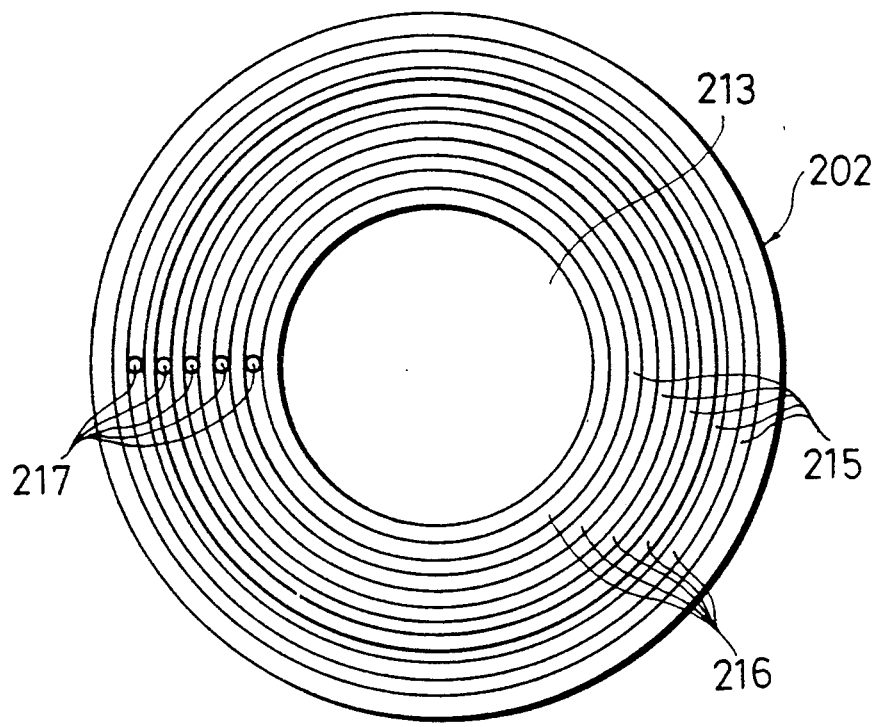

As shown in FIG. 10, the upper case 202 has a top plate 214 provided with a center hole 213 open at center, and is rotatably connected with the lower case 201 by a snap connection inside the collar 212 of the inner peripheral wall 208. The top plate 214 has a plurality of projecting walls 215 vertically formed concentrically with the center hole 213 at center, adjacent projecting walls 215 forming a plurality (five in this embodiment) of concentric second cable stowage grooves 216. The second cable stowage grooves 216 and the first cable stowage grooves 211 face each other with a spacer 203 described below inserted therebetween. A cable hole 217 is provided also in the upper part of each of the second cable stowage grooves 216.

The spacer 203 is produced of a sliding material such as a synthetic resin molding and has an opening 218 in a part of a disc-like member, being rotatably held between the first cable stowage groove 211 of the lower case 201 and the second cable stowage groove 216 of the upper case 202.

The flexible cables 204 and 205 are made of cables called wire harness with its conductor covered with an insulator. In this embodiment, five wire harnesses are used. These flexible cables are composed of two first flexible cables 204 and three second flexible cables 205 which are wound in opposite directions, each of the first flexible cables 204 being wound counterclockwise in each of the first cable stowage grooves 211 of the lower case 201 with its one end wound by about a half turn backward at the opening 218 and with the other end wound clockwise along each of the second cable stowage grooves 216 of the upper case 202 which face the first cable stowage grooves 211. In the meantime, each of the second flexible cables 205 is wound in the clockwise direction within each of the first cable stowage grooves 211 with its one end wound a half turn backward at the opening 218 and the other end wound counterclockwise along the second cable stowage groove 216. One end of these flexible cables 204 and 205 is led out of the lower case 201 through the cable hole not illustrated, being bent into a form of a crank and fixed within a holder 219 mounted on the lower surface of the bottom plate 207 of the lower case 201 and then connected in one bundle to a lower connector (not illustrated).

Next, the operation of the clock spring according to the second embodiment will be explained mainly with reference to FIGS. 11 and 12, using an example in which the lower case is used as a stationary member and the upper case 202 as a movable member. These drawings schematically illustrate each of the flexible cables 204 and 205. The lower case 201 and the upper case 202 are not shown.

Figure 15:
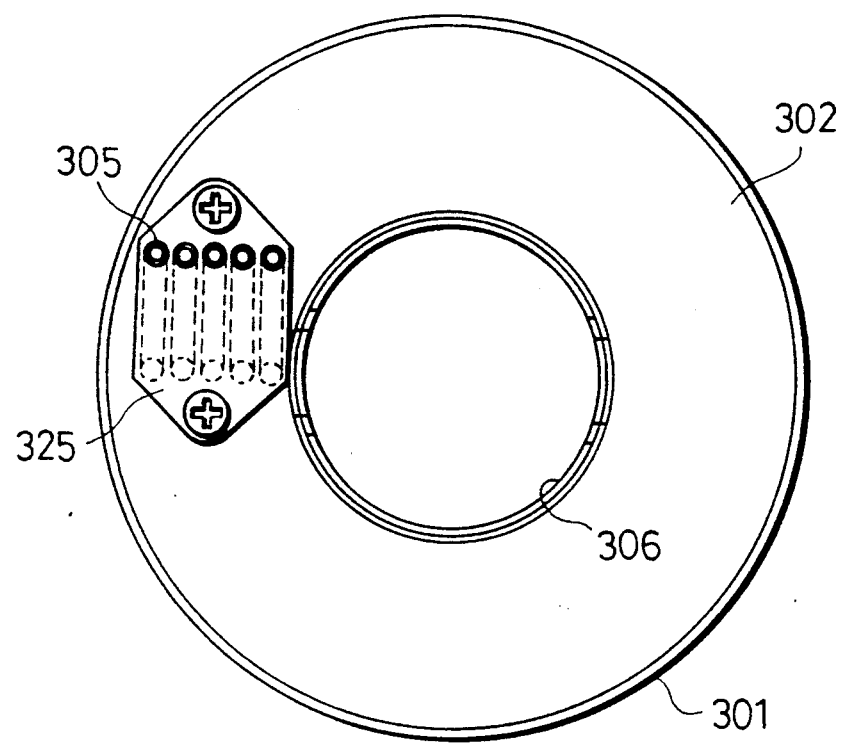

First, FIG. 15 shows the state where almost all of the first flexible cables 205 are coiled in the first stowage groove 211 of the lower case 201 and also almost all the second flexible cables 205 are coiled in the second cable stowage groove 216 of the upper case 202.

Figure 11:
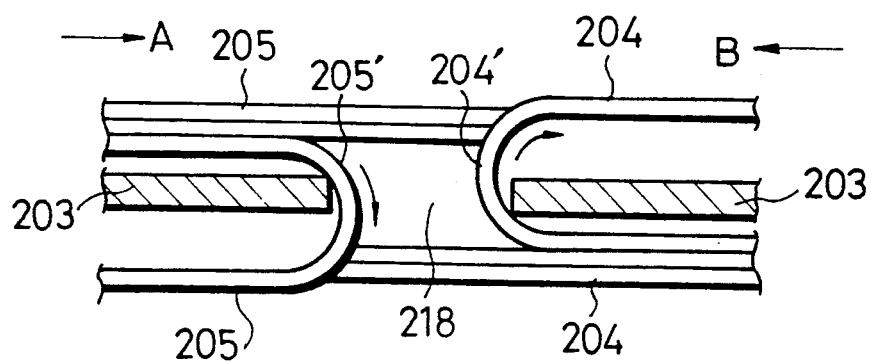
Figure 12:
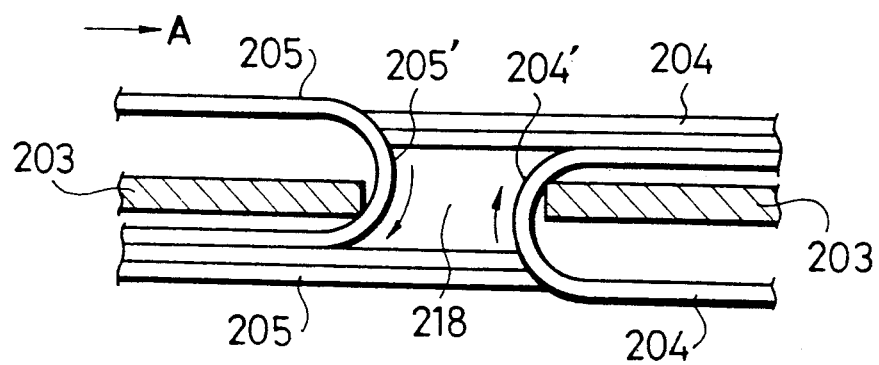

When the upper case 202 for example is turned in the counterclockwise direction (the direction of the arrow A) for a specific amount of rotation from the state shown in FIG. 11, the turning sections 204' and 205' of the first and second flexible cables 204 and 205 move in the direction of the arrow A by half the amount of rotation, paying out the first flexible cable 204 by a length equal to this movement from the lower case 201 into the second cable stowage groove 216 of the upper case 202. At the same time, the same amount of the second flexible cable 205 goes out of the upper case 202 into the first cable stowage groove 211 of the lower case 201. In this case, since the turning section 204 of the first flexible cable 204 comes in contact with the peripheral edge of the opening 218, the spacer 203 is driven to turn by half the amount of rotation of the upper case 202 in the direction of the arrow A, thus turning the opening 218 after the turning sections 204' and 205' of the flexible cables 204 and 205.

Therefore, as the upper case 202 rotates by N turns in the direction of the arrow A, each of the turning sections 204' and 205' and the spacer 203 make N/2 turns in the direction of the arrow A, the second flexible cable 205 being coiled by the N/2 turns into the first cable stowage groove 211 from the second cable stowage groove 216 through the opening 218 and also the first flexible cable being coiled by the N/2 turns into the second cable stowage groove 216 from the first cable stowage groove 211 through the opening 218.

Hereafter, the upper case 202 can be rotated in the direction of the arrow A until all the second flexible cable 205 coiled in the second cable stowage groove 216 of the upper case 202 is wound into the first cable stowage groove 211 of the lower case 201, that is, for twice as large as the number of turns of the second flexible cable 205 wound in the upper case 202. In this state, all the first flexible cable 204 stowed in the first cable stowage groove 211 is turned into the second cable stowage groove 216.

Conversely, when the upper case 202 is turned in the counterclockwise direction (the direction of the arrow B) from the state that almost all the first flexible cable 204 is stowed in the second stowage groove 216 of the upper case 202 and almost all the second flexible cable 205 is coiled in the first cable stowage groove 211 of the lower case 201, the turning section 204' of the second flexible cable 204 comes in contact with the peripheral edge of the opening 218, driving to turn the spacer 203 in the direction of the arrow B. Thus, both the turning sections 204' and 205' of the flexible cables 204 and 205 and the spacer 203 rotate in the direction of the arrow B by half the amount of rotation of the upper case, thereby winding the second flexible cable 205 by a length equal to the movement of the spacer 203 into the second cable stowage groove 216 of the upper case 202 from the first cable stowage groove 211 of the lower case 201 through the opening 218. At the same time, the first flexible cable 204 of a length equal to this is wound from the second cable stowage groove 216 into the first cable stowage groove 211 through the opening 218.

In the second embodiment described above, it is sufficient that the clock spring connector is provided with the first and second flexible cables 204 and 205 which have a length of about half the distance of the rotation required. It is, therefore, possible to make the flexible cables 204 and 205 extremely short as compared with prior-art clock spring connectors. And moreover since wire harnesses are usable as the flexible cables 204 and 205, the total cost of the clock spring connector can be considerably lowered. Also, since the flexible cables 204 and 205 can be shortened, the diameter of the cable stowage section can be decreased, it is advantageous for the use of a compact clock spring connector.

The first cable stowage groove 211 and the second cable stowage groove 216 are concentrically formed at the same pitch in the opposite surfaces of the lower case 201 and the upper case 202, and a spacer 203 is disposed between these cable stowage qrooves 211 and 216. It is, therefore, possible to prevent entanglement of the flexible cables 205 and also to prevent entanglement of one flexible cable 204 or 205 between the first cable stowage groove 211 and the second cable stowage groove 216, thereby enabling smooth coiling and uncoiling of these flexible cables 204 and 205.

Furthermore, the first and second flexible cables 204 and 205 are wound in opposite directions and the spacer 203 is designed to be driven to turn by one of the flexible cables (204 or 205) when the upper case 202 is turned. The driving mechanism of this spacer 203, therefore, can be simplified, enabling the miniaturization of the clock spring connector.

Figure 13:
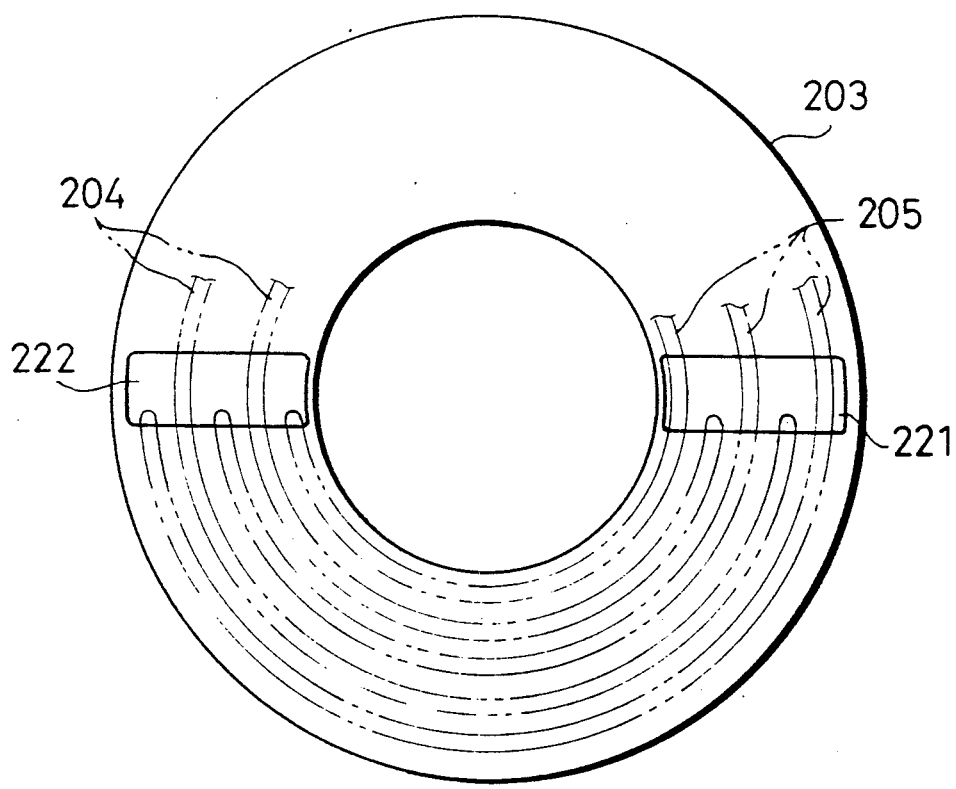

In the embodiment described above, the first and second flexible cables 204 and 205 are positioned in the common opening 218 of the spacer 203. The number of openings such as the opening 218, however, is not limited to this, but the spacer 203 may be provided with two openings 221 and 222 for example as shown in FIG. 13, so that the first flexible cable 204 may be turned back at either one opening 221 and the second flexible cable 205 may be turned back at the other opening 222. In this case, as the turning sections 204' and 205' of the first and second flexible cables 204 and 205 are separated to the openings 221 and 222, it is possible to prevent these turning sections 204' and 205' from entangling with each other.

In the embodiment described above, the first and second cable stowage grooves 211 and 216 are formed integral with the lower and upper cases 201 and 202 respectively; however, it is possible to provide the spacer 203 with both the cable stowage grooves 211 and 216 by integrally forming the projecting walls 210 and 215 in both the upper and lower sides of the spacer 203 for example, or to provide the spacer 203 with either one of the cable stowage grooves 211 and 216.

Furthermore, in the embodiment described above, the lower case 201 is used as the stationary member, and the upper case 202 as the movable member. Conversely to the above-described, the upper case 202 may be used as the stationary member and the lower case as the movable member.

Furthermore, in the embodiment described above, a plurality of wire harnesses are adopted as the first and second flexible cables 204 and 205. Bare conductors not covered with an insulator or flat covered conductors may be used for the wire harnesses.

Furthermore, in the above described embodiment, two first flexible cables 204 and three second flexible cables 205, five in all, are employed and stowed in the same number of the first and second cable stowage grooves 211 and 216. However, it should be understood that the number of these flexible cables is not limited thereto. It is also possible that the flexible cables 204 and 205 are not wound in all of the plurality of the first and second cable stowage grooves 211 and 216, but at least one each of the first and second flexible cables 204 and 205 is wound in a selected part of the cable stowage grooves 211 and 216. In this case, a common clock spring connector is usable for two circuits or n circuits (n denotes the number of the first and second cable stowage grooves 11 and 16).

Figure 14:
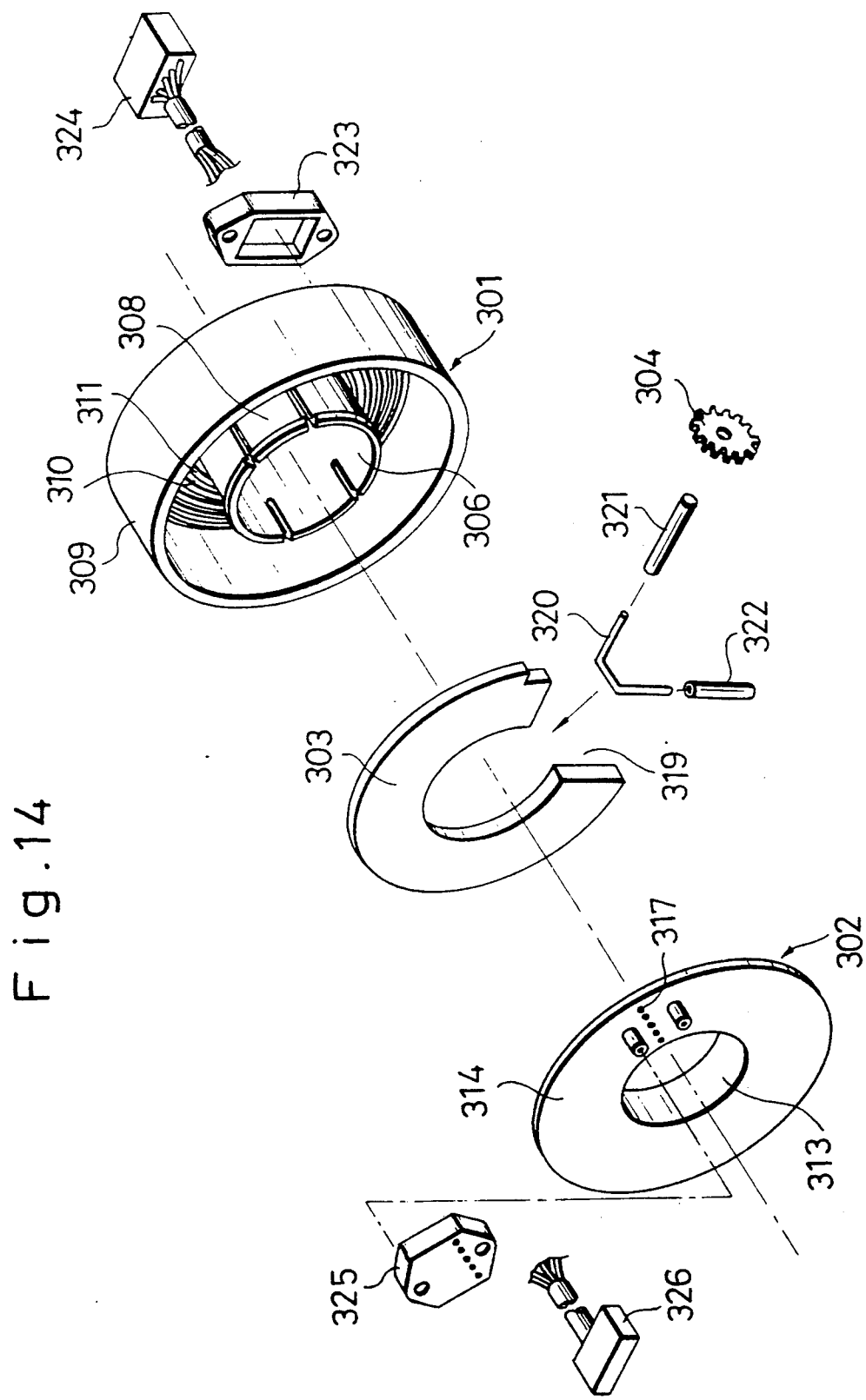
Figure 16:
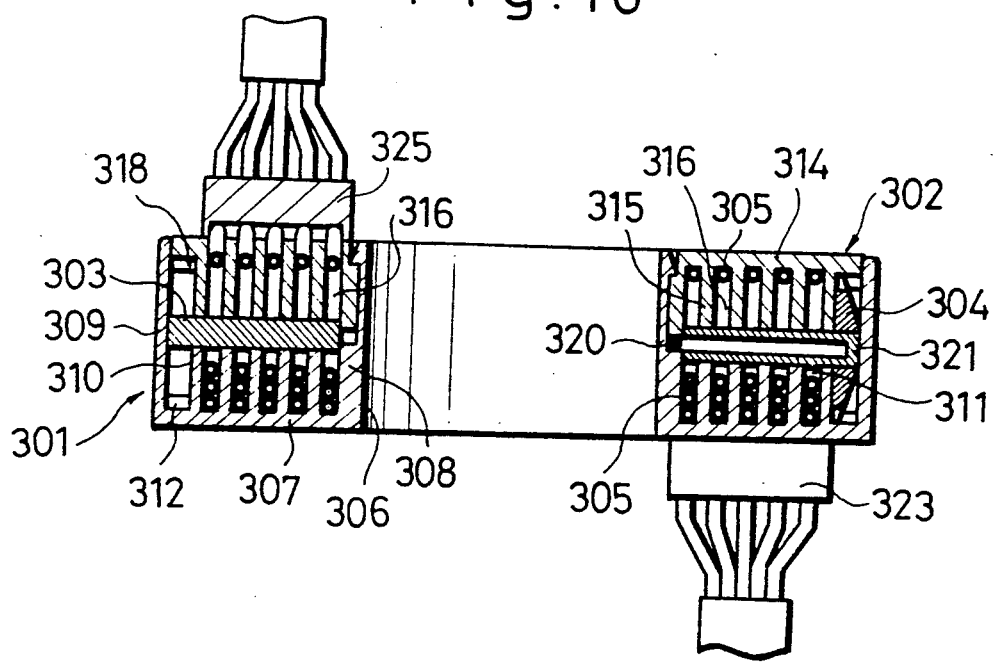

Next, a third embodiment of the present invention will be explained. The clock spring connector according to this embodiment, as shown in FIGS. 14 to 16, roughly comprises a lower case 301, an upper case 302 rotatably held in relation to the lower case 301, a spacer 303 rotatably held between these two cases 301 and 302, a gear 304 for driving the spacer 303, and a flexible cable 305 coiled in between these cases 301 and 302.

The lower case 301 has a bottom plate 307 provided with a center hole 306 at center, and an inner peripheral wall 308 and an outer peripheral wall 309 provided at the inner and outer peripheries of this bottom plate 307, being formed in a bottomed cylinder on the whole. The bottom plate 307 has a plurality of projecting walls 310 formed concentrically with the center hole 306 at center, adjacent projecting walls 310 forming a plurality (five in this embodiment) of concentrical first cable stowage grooves 311. In the bottom of these first cable stowage grooves 311 are provided cable holes (not illustrated). The bottom plate 307 located between the outermost peripheral projecting wall 310 and the outer peripheral wall 309 is provided with a first rack 312 of a plane ring form which is in mesh with the gear 304 described later on.

Figure 17:
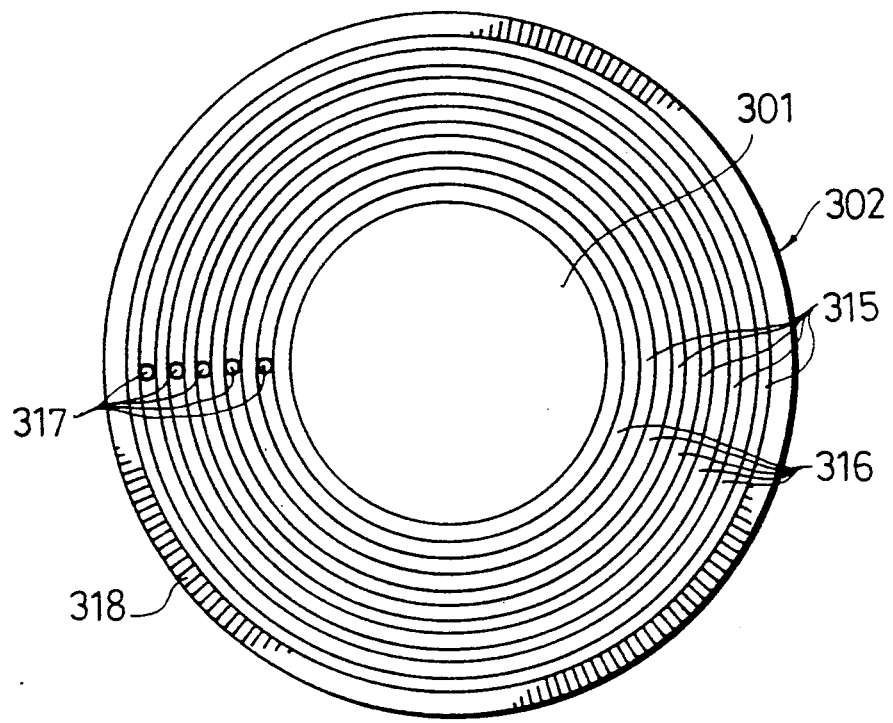

As shown in FIG. 17, the upper case 302 has a top plate 314 provided with a center hole 313 at center and rotatably connected to the lower case 301 by snap connection inside of the inner peripheral wall 308. The top plate 314 is provided with a plurality of projecting walls 315 vertically formed concentrically with the center hole 313 at center, adjacent projecting walls 315 forming a plurality (five in this embodiment) of second cable stowage grooves 316 formed concentrically. The second cable stowage grooves 316 and the first cable stowage grooves 311 face each other with the spacer 303, inserted therebetween, which is described later on. In the upper part of each of the second cable stowage grooves 316 is also provided a cable hole 317. Furthermore, on the peripheral edge of the top plate 314 is formed a second rack 318 of a plane ring form, which is engaged with the gear 304.

Figure 18:
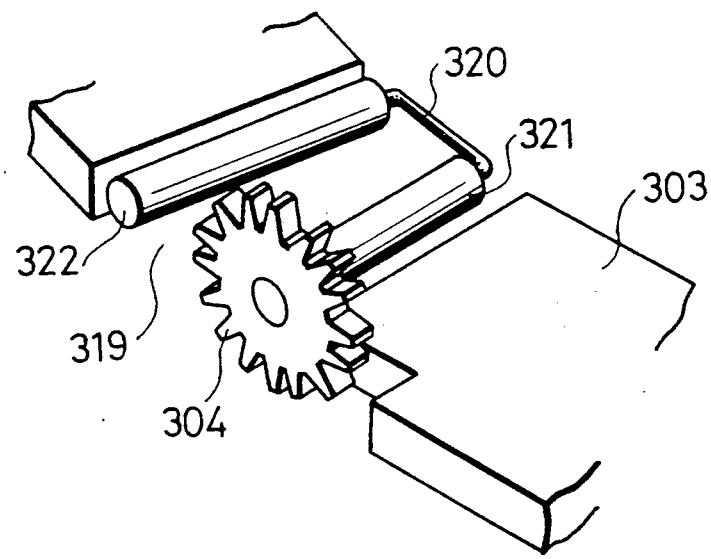

The spacer 203 is a disc spacer produced of a material having excellent slidability such as a synthetic resin molding. It is provided with an opening 319 in a part of the disc and held between the first cable stowage groove 311 of the lower case 301 and the second cable stowage groove 316 of the upper case 302. As shown in FIG. 18, a shaft-like member 320 having two arms is inserted in the opening 319. On the arms of the shaft-like member are rotatably supported a first roller 321 and a second roller 322. On one end of the first roller 321 is pressed in and fixed the gear 304 and, as described above, the gear 304 is designed to mesh with the first and second racks 312 and 318.

The flexible cables 305 are wire harnesses the conductors of which are covered with an insulator. In this embodiment, five wire harnesses are used. As shown in FIG. 16, these flexible cables 305 are coiled in each of the first cable stowage grooves 311 of the lower case 301, with one end passing through the opening 319 and turned about a half turn back on the second roller 322 and the other end being wound along each of the second cable stowage grooves 316 that face the upper case 302. One of each of these flexible cables 305 is led out of the lower case 301 through the cable hole not illustrated, bent into a form of crank and fixed in the holder 323 attached on the lower surface of the bottom plate 307 of the lower case 301, and connected in a bundle to the lower connector 324. In the meantime, the other end of these flexible cables 305 is led out of the upper case 302 through the cable hole 317, bent into a form of crank and fixed in the holder attached on the upper surface of the top plate 314 of the upper case 301, and then connected in a bundle to the upper connector 326.

Figure 19A:
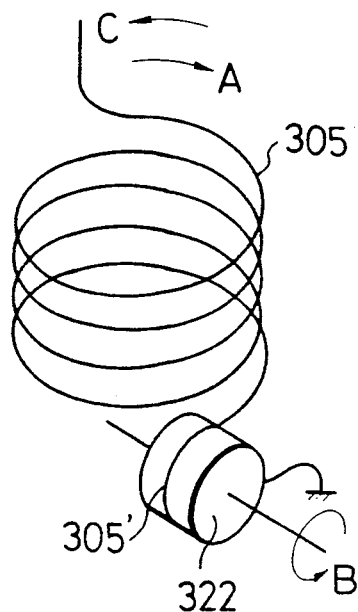
Figure 19B:
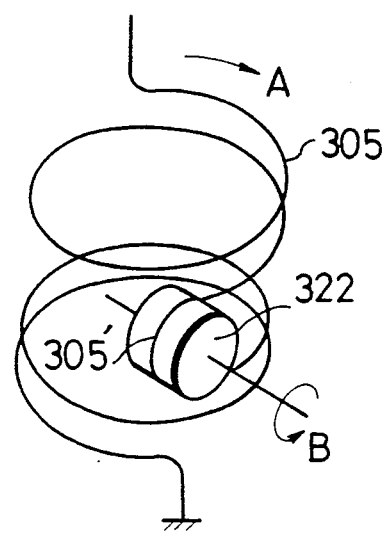
Figure 19C:
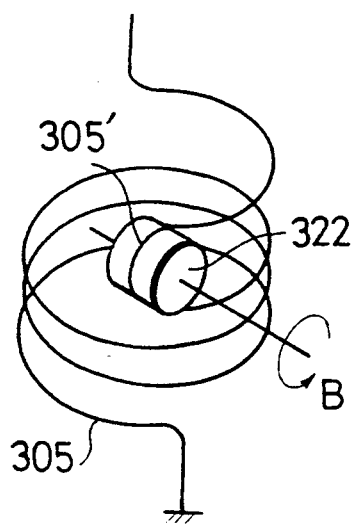

Next, the operation of the clock spring connector according to the embodiment described above using the lower case 301 as a stationary member and the upper case 302 as a movable member will be described mainly with reference to FIG. 19. FIG. 19 schematically shows one of the flexible cables 305. The lower case 301, the upper case 302 and the spacer 303 are not illustrated.

First, FIG. 19 (a) shows the state that most of one of the flexible cables 305 is coiled in the second cable stowage groove 316 of the upper case 302. In this case, the upper case 302 is in the end position of the counterclockwise turn.

When the upper case 302 is turned for a specific amount in a clockwise direction (the direction of the arrow A) from the state shown in FIG. 19 (a), the turning section 305' of the flexible cable 305 wound on the second roller 322 moves by half the amount of rotation in the direction of the arrow A as shown in FIG. 19 (b). The flexible cable 305 goes out by a length equal to this movement, being coiled into the first cable stowage groove 311 of the lower case 301. In this case, the racks 312 and 318 of the lower and upper cases 301 and 302 rotate by half the amount of rotation of the upper case 302 in the direction of the arrow A while turning in the direction of the arrow B. Therefore, the spacer 303 axially supporting the gear 304, and the turning section 305' of the flexible cable 305 rotate by the same amount in the same direction.

Therefore, as the upper case 302 is rotated by N turns in the direction of the arrow A, the spacer 303 and the second roller 22 axially supported thereby rotate by N/2 turns, and the flexible cable 305 as long as N/2 turns is wound into the first cable stowage groove 311 from the second cable stowage groove 316 through the opening 319.

Hereafter, the upper case 302 can be turned in the direction of the arrow A until all the flexible cable 305 wound in the second cable stowage groove 316 of the upper case 302 is fully coiled into the first cable stowage groove 311 of the lower case 301, that is, through twice as large as the number of turns of the flexible cable wound in the upper case 302. Thus the upper case 302 is at the end position in the clockwise direction.

Conversely to the above-described, when the upper case 302 is turned in the counterclockwise direction (the direction of the arrow C) from the state that most of the flexible cable 305 has been wound in the first cable stowage groove 311 of the lower case 301, the turning section 305' of the flexible cable 305 and the spacer 303 rotate by half the amount of this rotation in the direction of the arrow B, a length of the flexible cable 305 equal to the movement of the spacer 303 is wound into the second cable stowage groove 316 of the upper case 302 from the first cable stowage groove 311 of the lower case 301 through the opening 319.

In the third embodiment, as described above, it is sufficient to provide the flexible cable 305 having a length half the distance of the required amount of rotation. It is, therefore, possible to make the flexible cable 305 extremely short as compared with prior art clock spring connectors. Moreover, wire harnesses can be used as the flexible cable 305, thereby enabling a large reduction of the total cost of the clock spring connector. Since the flexible cable 305 to be used is short, the cable stowage section can be decreased in diameter, being advantageous for the use of a compact clock spring connector.

In the opposite surfaces of the lower and upper cases 301 and 302 are concentrically formed the first cable stowage grooves 311 and the second cable stowage grooves 316 at the same pitch. And between these cable stowage grooves 311 and 316 is interposed the spacer 303, thereby preventing not only the entanglement of the flexible cables 305 with each other but also the entanglement of one of the flexible cable 305 between the first cable stowage groove 311 and the second cable stowage groove 316, and accordingly ensuring smooth coiling and uncoiling of the flexible cable 305.

Furthermore, the gear 304 is axially supported by the spacer 303, in mesh with ring-like racks 312 and 318 formed in the lower case 301 and the upper case 302, enabling the spacer 303 to follow the movement of the turning section 305' of the flexible cable 305. Therefore the coiling and uncoiling of the flexible cable 305 can be smoothly performed without exerting an excess force to the flexible cable 305.

Figure 20:
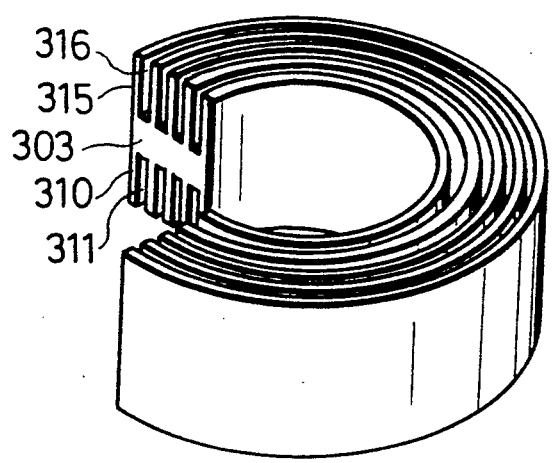

In the embodiment described above, the first and second cable stowage grooves 311 and 316 are formed integral with the lower and upper cases 301 and 302 respectively. As shown in FIG. 20, projecting walls 310 and 315 are integrally formed on the upper and lower surfaces of the spacer 303, thereby enabling the provision of the cable stowage grooves 311 and 316 in the spacer 303 or one of the cable stowage grooves 311 and 316 in the spacer 303.

Furthermore, in the embodiment described above, the lower case is used as a stationary member and the upper case 302 as a movable member. Conversely, the upper case 302 may be used as the stationary member and the lower case 301 as the movable member.

Furthermore, in the embodiment described below, the gear 304 and the first and second racks 312 and 318 are used as means for driving the spacer 303. For these driving means, for example a rubber roller may be supported by the spacer 303 and rotated in contact with the opposite surfaces of the lower case 301 and the upper case 302.

Furthermore, in the embodiment described above, a plurality of wire harnesses are used as the flexible cables 305, which, however, may be substituted for by bare conductors not covered with an insulator, or flat covered conductors, or a plurality of multicore cables comprising lead wires of separate circuits which are covered with a common insulator.

Furthermore, in the embodiment described above, five flexible cables 305 and the same number of first and second cable stowage grooves 311 and 316 are provided. The number of these cables and grooves, however, is not limited to the above-described. It is possible to selectively wind a part of the cables, not to wind the flexible cable 305 in all of the plurality of the first and second cable stowage grooves 311 and 316. In this case, a common clock spring connector can be utilized for one circuit or n circuits (n the number of the first and second cable stowage grooves 311 and 316).

What is claimed is:

1. A clock spring connector having a stationary member, a movable member rotatably mounted on said stationary member, and cables stowed in a cable stowage section formed between said stationary member and said movable member, with one end of said cables fixed on said stationary member and led outside and the other end fixed on said movable member and led outside, said clock spring connector comprising: cable stowage grooves on the stationary side and cable stowage grooves on the movable side provided concentrically with a rotating shaft of said movable member at center within said cable stowage section; and a plurality of said cables wound all in one direction in said cable stowage grooves on either the stationary or the movable side, with a remaining portion of said cables reversely wound in the other cable stowage grooves.

2. A clock spring connector as claimed in claim 1, wherein a rotating member is disposed between said cable stowage grooves on the stationary and the movable side, said rotating member being interlocked with said movable member.

3. A clock spring connector as claimed in claim 2, wherein said rotating member includes a slide sheet in contact with said cables.

4. A clock spring connector as claimed in claim 2, wherein a rolling member rolling in contact with said stationary member and said movable member is provided on said rotating member in order to transmit the rotation of said movable member to said rotating member through said rolling member.

5. A clock spring connector as claimed in claim 2, wherein said rotating member includes a guide member which guides a return part of said cable positioned between said cable stowage grooves on the stationary side and said cable stowage grooves on the movable side.

6. A clock spring connector as claimed in claim 2, wherein either one or both of the cable stowage grooves on the stationary side and the cable stowage grooves on the movable side are formed integral with said rotating member.

7. A clock spring connector having a stationary member, a movable member rotatably mounted on said stationary member, and cables stowed in a cable stowage section formed between said stationary member and said movable member, with one end of said cables fixed on said stationary member and led outside and the other end fixed on said movable member and led outside, said clock spring connector comprising: cable stowage grooves on the stationary side and cable stowage grooves on the movable side provided concentrically with a rotating shaft of said movable member at center within said cable stowage section; and a plurality of said cables wound in normal and reverse directions along said cable stowage grooves on either the stationary or the movable side with the remaining portion of said cables reversely wound along said other cable stowage grooves.

8. A clock spring connector as claimed in claim 7, wherein a rotating member is disposed between said cable stowage grooves on the stationary side and said cable stowage grooves on the movable side, said rotating member being interlocked with said movable member.

9. A clock spring connector as claimed in claim 8, wherein said rotating member includes a slide sheet which slides in contact with said cables.

10. A clock spring connector having a stationary member, a movable member rotatably mounted on said stationary member, and cables stowed in a cable stowage section formed between said stationary member and said movable member, with one end of said cables fixed to said stationary member and led outside and the other end fixed on said movable member and led outside, said clock spring connector comprising: spiral cable stowage grooves on the stationary side and spiral cable stowage grooves on the movable side which extend in opposite directions in said cable stowage section, said cables being wound along said cable stowage grooves on either the stationary side or the movable side, with the remaining portion of said cables turned back and wound along other cable stowage grooves.

11. A clock spring connector as claimed in claim 10, wherein a rotating member is disposed between said cable stowage grooves on the stationary side and said cable stowage grooves on the movable side, said rotating member being interlocked with said movable member 12. A clock spring connector as claimed in claim 11, wherein said rotating member has a rolling member rolling in contact with said stationary member and said movable member in order to transmit the rotation of said movable member to said rotating member through said rolling member.

13. A clock spring connector as claimed in claim 11, wherein said rotating member includes a guide member which guides the turning part of said cables located between said cable stowage grooves on the stationary side and said cable stowage grooves on the movable side.

14. A clock spring connector as claimed in claim 10, wherein said cable stowage grooves on the stationary side and said cable stowage grooves on the movable side are a plurality of multiple spiral grooves parallelly extending.

15. A clock spring connector having a stationary member, a movable member rotatably mounted on said stationary member, and cables stowed in a cable stowage section formed between said stationary member and said movable member with one end of said cables fixed on said stationary member and led outside and the other end fixed on said movable member and led outside, said clock spring connector comprising: a rotating member rotatably disposed in said cable stowage section; cable stowage grooves on the stationary side and cable stowage grooves on the movable side which are provided concentrically with a rotating shaft of said movable member at center, in each of two cable stowage sections divided by said rotating member, said cables being wound along either one of said stationary and movable stowage grooves on the stationary and movable sides with a remaining part of said cables reversely wound along the other cable stowage grooves.

16. A clock spring connector as claimed in claim 15, wherein an opening to pass the turning part of said cables therethrough is formed in said rotating member.

17. A clock spring connector as claimed in claim 15, wherein said rotating member includes a slide sheet which slides in contact with said cables.

18. A clock spring connector as claimed in claim 15, wherein said rotating member is provided with a rolling member rolling in contact with said stationary member and said movable member in order to transmit the rotation of said movable member to said rotating member through said rolling member.

19. A clock spring connector as claimed in claim 18, wherein said rolling member is a gear.

20. A clock spring connector as claimed in claim 18, wherein said rolling member is a roller.

21. A clock spring connector as claimed in claim 15, wherein said rotating member includes a guide member which guides the turning part of said cables.

22. A clock spring connector as claimed in claim 16, wherein said guide member is located in said opening.

23. A clock spring connector as claimed in claim 15, wherein either one or both of said cable stowage grooves on the stationary side and said cable stowage grooves on the movable side are formed integral with said rotating member.

* * * * *